(12) United States Patent
Heher et al.

(10) Patent No.: US 12,226,821 B2
(45) Date of Patent: Feb. 18, 2025

(54) METHOD AND SYSTEM FOR MANUFACTURING EQUIPMENT

(71) Applicant: Transportation IP Holdings, LLC, Norwalk, CT (US)

(72) Inventors: Brett Heher, Pittsburgh, PA (US); Mahantesh Mallappa Hosur, Bangalore (IN); Krishnamurthy Vaidyanathan, Bangalore (IN); Kevin Paul Bailey, Mercer, PA (US); Sudeep Pradhan Sadananda Rao, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 318 days.

(21) Appl. No.: 17/369,573

(22) Filed: Jul. 7, 2021

(65) Prior Publication Data

US 2022/0008994 A1 Jan. 13, 2022

Related U.S. Application Data

(60) Provisional application No. 63/049,401, filed on Jul. 8, 2020.

(51) Int. Cl.
*B22F 10/10* (2021.01)
*B22F 10/38* (2021.01)
(Continued)

(52) U.S. Cl.
CPC ............ *B22F 10/10* (2021.01); *B22F 10/385* (2021.01); *B22F 10/50* (2021.01); *B33Y 10/00* (2014.12);
(Continued)

(58) Field of Classification Search
CPC .. B22F 10/60; B22F 10/64; B22F 7/06; B22F 3/02; B22F 3/10; B22F 3/1017;
(Continued)

(56) References Cited

U.S. PATENT DOCUMENTS 3,221,718 A * 12/1965 Isley .................. F01P 3/08
123/41.35
5,487,865 A * 1/1996 Hampton ............ B22F 3/1115
419/30
(Continued)

FOREIGN PATENT DOCUMENTS

EP 2233232 A1 9/2010
JP 2004300511 A 10/2004

OTHER PUBLICATIONS

Szewczyk-Nykiel et al. ("Sinter-bonding of AISI 316L and 17-4 PH stainless steels." Journal of Materials Engineering and Performance 27 (2018): 5271-5279.) (Year: 2018).*

(Continued)

*Primary Examiner* — Ricardo D Morales
(74) *Attorney, Agent, or Firm* — K&L Gates LLP

(57) ABSTRACT

A method or process may be provided that includes forming a first sinterable equipment part using a first manufacturing method, and forming a second equipment part using a second manufacturing method. The sinterable first equipment part may then be heated while securing the first equipment part to the second equipment part to form a monolithic equipment part.

20 Claims, 4 Drawing Sheets

(51) Int. Cl.
  *B22F 10/50* (2021.01)
  *B33Y 10/00* (2015.01)
  *B33Y 40/00* (2020.01)
  *B33Y 70/00* (2020.01)

(52) U.S. Cl.
  CPC .............. *B33Y 40/00* (2014.12); *B33Y 70/00* (2014.12); *B22F 2301/35* (2013.01)

(58) Field of Classification Search
  CPC .. B22F 3/1021; B22F 2003/1046; B22F 3/12; B22F 3/14; B22F 3/15; B22F 7/02; B22F 7/04; B22F 7/08; B22F 2207/17; B33Y 10/00
  See application file for complete search history.

(56) References Cited

U.S. PATENT DOCUMENTS

| | | | | |
|---|---|---|---|---|
| 5,514,480 A * | 5/1996 | Takagi | ................... | C22C 49/04 428/592 |
| 5,948,549 A | 9/1999 | Takayama et al. | | |
| 6,322,746 B1 * | 11/2001 | LaSalle | ................... | B22F 1/10 419/36 |
| 2014/0299091 A1 * | 10/2014 | Ribeiro | ................... | B22F 5/008 164/76.1 |
| 2017/0348770 A1 * | 12/2017 | Kwon | ................... | B33Y 10/00 |
| 2020/0018008 A1 | 6/2020 | Richard | | |
| 2020/0180083 A1 | 6/2020 | Richard | | |

OTHER PUBLICATIONS

Office Action received for related Russian Patent Application No. 202191576 dated Apr. 25, 2022 (2 pages).
English translation of Office Action received for related Russian Patent Application No. 202191576 dated Apr. 25, 2022 (2 pages).
Search Report for related Eurasian Patent Application No. 202191576 dated Nov. 17, 2021 (4 pages).
Office Action received for related Eurasian Patent Application No. 202191576 dated Nov. 14, 2022 (4 pages).
Office Action received for related Eurasian Patent Application No. 202191576 dated Jan. 24, 2024 (4 pages).
Search Report received for related Eurasian Patent Application No. 202191576 dated Jan. 23, 2024 (6 pages).

* cited by examiner

METHOD AND SYSTEM FOR MANUFACTURING EQUIPMENT

CROSS-REFERENCE TO RELATED APPLICATIONS

This application claim priority to U.S. Provisional Application No. 63/049,401 entitled Method and System for Manufacturing Equipment filed Jul. 8, 2020, hereby incorporated by reference herein.

BACKGROUND

Technical Field

The subject matter described relates to a methods and processes for manufacturing equipment.

Discussion of Art

Metal injection molded parts and equipment may be bonded during a sintering process. Sintering is a method by which powdered metal and adhesive is warmed to a temperature just under the melting point of the metal to bond the powdered particles together. The warming may be done by a laser, in an oven, or the like. The metal injection molded parts have manufacturing limits that are inherent to the metal injection molding process.

Additive manufacturing processes have formed such as three-dimensional (3-D) printing. During a 3-D printing process successive layers of a part are deposited until the part is formed. Each layer is basically a thinly sliced cross-section of the part being formed. Such manufacturing allows for the formation of complex shapes. It may be desirable to have systems and methods that differ from those that are currently available.

BRIEF DESCRIPTION

In one or more embodiments, a method is provided that may include heating a sinterable first equipment part while securing the first equipment part to a second equipment part to form a monolithic equipment part.

In one or more embodiments a method is provided that may include additively manufacturing a conductive green body; and obtaining a non-sinterable conductive body. The method may include heating both the conductive green body and the non-sinterable conductive body together to sinter the conductive green body and to couple the conductive green body with the non-sinterable conductive body.

In one or more embodiments, a method is provided that may include coupling a sinterable, conductive green body with a non-sinterable body, and sintering the sinterable, conductive green body and the non-sinterable body to form a combined assembly of a sintered conductive body and the non-sinterable body.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to methods and processes for forming equipment using combining equipment parts. A first part of the equipment may be formed using a first manufacturing method, while the second part is formed using a second manufacturing method. In one example, the first part is made from metal injection molding, while the second part is manufactured using an additive process. One of the first or second parts may be sinterable such that the first and second parts may then be heated to bond the parts together to form a single monolithic piece of equipment.

The term non-sinterable as used herein refers to a body, part, portion, etc. that is provided in a final state, such that the body may not be able to be sintered. Specifically, the body, part, portion, etc. has already been solidified, such that the body, part, portion, etc. cannot be sintered during a combination or coupling process or step with another body, part, portion, etc. Such non-sinterable materials include materials that cannot be sintered, and materials that can be sintered, but have already gone through the sintering process, and thus cannot be re-sintered. As an example, a metal powder may undergo sintering in a determined temperature range for a determined period to bond each of the metal powder particle to one another. After the determined period, the bonded particles may be cooled (e.g. lowered) to form a single formed metallic body, part, portion, etc. If the single formed metallic body, part, portion, etc. is then reheated back into the determined temperature range for sintering, no particles remain, preventing additional sintering, even though the formed metallic body, part, portion and the like is within the determined temperature range. By transforming from the powder particles to the formed metallic body, part, portion, etc., the formed metallic body is now a material that is non-sinterable, even though the powder form of the material was sinterable.

The term sinterable as used herein refers to a body, part, portion, etc. that is not provided in a final state, such that the body may be able to be sintered. Specifically, the body, part, portion, etc. has not been solidified, such that the body, part, portion, etc. can be sintered during a combination or coupling process or step with another body, part, portion, etc. An example sinterable body, part, portion, etc. is a powdered metal, often using an adhesive binder, that has particles that may be bonded together through a sintering process.

Figure 1:
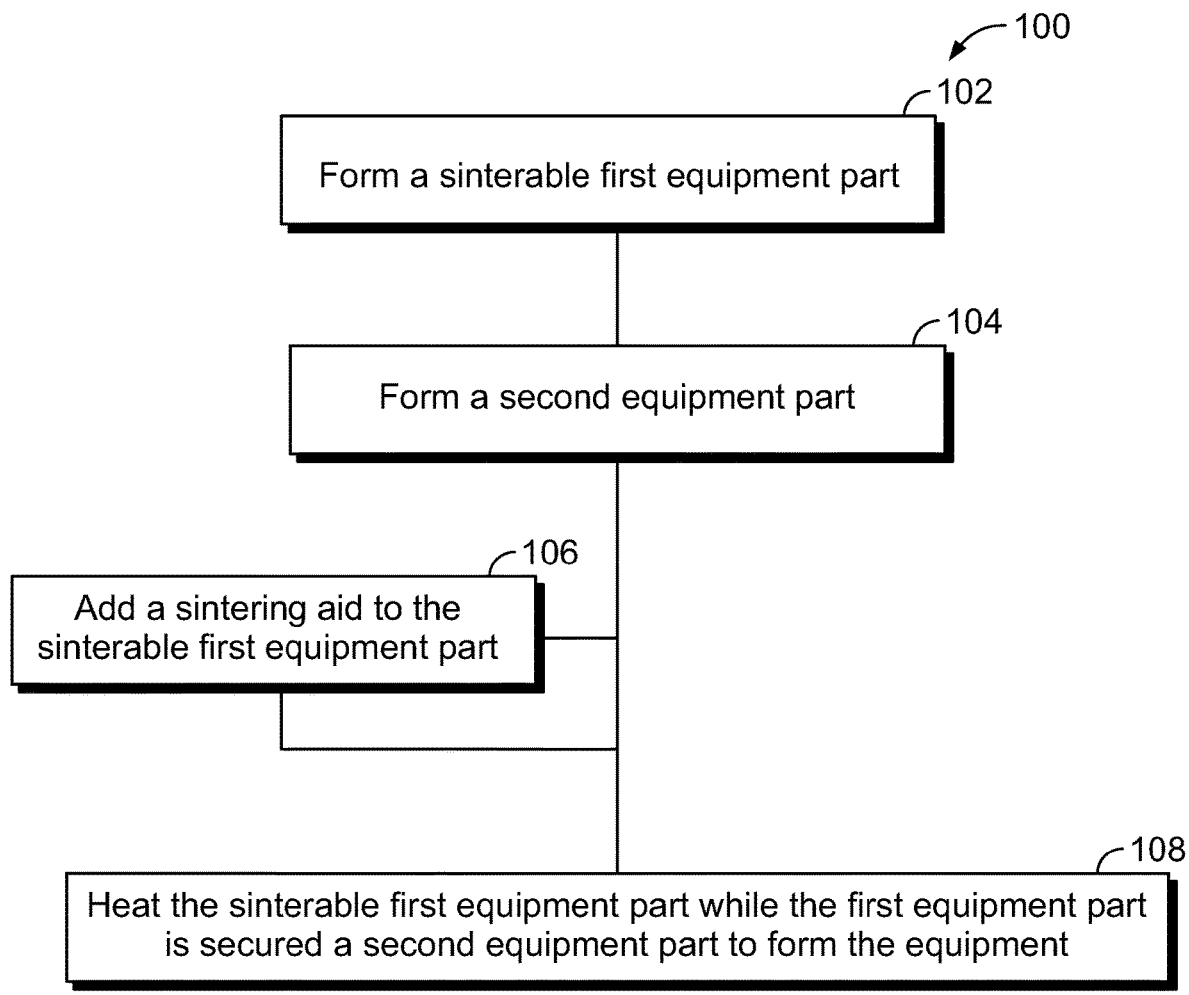
FIG. 1 illustrates a schematic process diagram of a process for manufacturing equipment.

FIG. 1 illustrates a method or process 100 for forming a single monolithic equipment part. The process may be utilized to combine or couple to bodies, parts, portions, or the like to form the equipment. By being a single monolithic equipment part, where previously two separate bodies, parts, portions, etc. are provided that can be physically separated, once formed as a single monolithic equipment part the bodies, parts, portion, or the like are of one piece with particles, components, molecules, etc. integrated together to form a single end product, equipment part, body, or the like having the same chemical formula, consistency, make-up throughout the single end product.

At step 102, a sinterable first equipment part is formed. The sinterable first equipment part may comprise a powdered metal, including steel, stainless steel, aluminum, titanium, copper, iron, alloys, etc. In one embodiment, the powdered metal may include a binder that holds the powder together. In one example, the powdered metal is part of a green body that represents a weakly bonded together mixture of the powdered metal and binder (bonding agent) before sintering occurs. In this manner, the sinterable first equipment part may be a sinterable three-dimensional green body. Optionally, during the heating process, the binder, or bonding agent, may evaporate. Specifically, by choosing a bonding agent that evaporates in the heating temperature range, the, only a metal remains as part of the equipment part, strengthening the equipment part.

In another example, only a portion of the first equipment part may comprise the powdered metal, with the rest of the first equipment part not able to be sintered. Alternatively, a flux agent may be applied at an interface between the sinterable first equipment part and the second equipment part. The flux agent may be configured to bond the sinterable first equipment part to the second equipment part during heating. In yet another example, when forming the sinterable first equipment part, the sinterable first equipment part may include one or more recesses at an interface between the sinterable first equipment part and the second equipment part. Such recesses may further facilitate coupling between the sinterable first equipment part and a second equipment part.

By forming the sinterable first equipment part separate from a second equipment part, the sinterable first equipment part may be a different metal, or formed form a manufacturing process that is more inexpensive than the second equipment part. As a result, when forming the single monolith piece of equipment, the simpler portions that require less complexity, flexibility, strength, or other differing characteristics may be formed separately from a second equipment part that is more expensive, more complex to manufacture, needs greater flexibility or strength, or the like and still combined to make the single monolith piece of equipment.

At step 104, a second equipment part is formed. The second equipment part may be formed using an additive process such as three-dimensional printing. In particular, additive processes are able to form equipment parts with more complex geometries as compared to other manufacturing methods such as metal injection molding. Still, additive processes are often more expensive than other manufacturing processes. Thus, by only forming the equipment parts with complex geometries with an additive process, and forming other parts with less expensive processes, the advantages of additive manufacturing is realized at reduced costs. In one example, the second equipment part may be formed to have an overhanging extension that extends farther from the second equipment part than any extension of the sinterable first equipment part. Thus, additional design flexibility of the second equipment part may be achieved.

At step 106, optionally, a sintering aid is added to the sinterable first equipment part to lower a sintering temperature of the sinterable first equipment part. The use of a sintering aid may change the sintering temperature of an equipment part. Suitable sintering aids may include nanoparticle sintering aids as well as mesoporous materials. Suitable sintering aids may include a transition metal (e.g. Groups IVB-VIII, IB, and IIB, or 4-12 of the periodic table). Suitable transition metals may include one or more of copper, iron, nickel, palladium, cobalt, and the like. The sintering aid may be in a liquid or solid form at room temperature and selected based on the end use application, the materials being used, and the additive manufacturing method employed. in one embodiment, different amounts of sintering aid may be added to different portions of the sinterable first equipment part. In this manner, the portion of the first equipment part where bonding through the sintering process is desired may receive the sintering aid accordingly. In one embodiment, controlling the amount of sintering aid present in various portions allows for controlled sintering such that some portions sinter before other portions.

In one example, the sinterable first equipment part may be formed from metal particles grouped together in a green body by additive manufacturing. A first density of the metal particles in the green body may be substantially common throughout the green body prior to adding the sintering aid. The sinterable first equipment part may have different densities in the different volumes of the sinterable first equipment part after heating the sinterable first equipment part. In some embodiments, different amounts of sintering aid may be added to different portions of the sinterable first equipment part. For example, having more sintering aid near a surface may allow the surface portion to sinter before an internal portion. This may allow for stress relaxation of the overall component during its build. Conversely, having more sintering aid internally (relative to the skin portion) may allow for internal support for the component while it finishes the sintering process, and may, in some instances, alleviate surface cracking. In yet other embodiments, the distribution of sintering aid may be in homogeneous in a first portion of the component being formed, but absent or at a different concentration in another portion distal to the first portion. Based at least in part on application specific parameters, the concentration of the sintering aid may change abruptly across a defined volume, or the concentration may change over a defined and/or controlled concentration gradient. Another degree of control can be achieved by using different sintering aid compositions in different portions of the part. Accordingly, the sintering process can be controlled as to rate, location, and order.

At step 108, the sinterable first equipment part is heated while the first equipment part is secured a second equipment part to form the equipment. Heating, or raising the temperature, of the sinterable material of the first equipment part may be provided by a laser, oven, or the like. The temperature of the sinterable first equipment part is raised to just below the melting point of the metal powder, causing bonding of the metal powder, along with bonding the first equipment part and second equipment part.

In one example, heating the sinterable first equipment part sinters the first equipment part, while in another example, heating the sinterable first equipment part does not sinter the second equipment part. In one example, the sinterable first equipment part and the second equipment part are both sinterable, and the sinterable first equipment part has a first sintering temperature, and the second equipment part has a second sintering temperature that is different from the first sintering temperature. In particular, the material of the first equipment part may be different than the material of the second equipment part, resulting in different sintering temperature ranges for each equipment part.

In one embodiment, heating the sinterable first equipment part occurs at a temperature that is at least as hot as a hotter sintering temperature of the first sintering temperature and the second sintering temperature. Specifically, heating the first equipment part and the second equipment part may include ramping a temperature at which the sinterable first equipment part and the second equipment part are heated to the first sintering temperature. The heating temperature of the sinterable first equipment part and the second equipment part may then be held at one or more of the first sintering temperature, or a temperature that is hotter than the first sintering temperature but cooler than the second sintering temperature. Then, the heating temperature of the first equipment part and the second equipment part may be ramped to the second sintering temperature. In this manner, sintering occurs for both the first equipment part and second equipment part. Consequently, heating the sinterable first equipment part bonds the sinterable first equipment part to the second equipment part without welding or brazing the sinterable first equipment part to the second equipment part.

In yet another embodiment, heating the sinterable first equipment part shrinks the sinterable first equipment part to form an interference fit to the second equipment part without welding or brazing the sinterable first equipment part to the second equipment part. The metal powder and binding material of the sinterable first equipment part may have different coefficients of thermal expansion, causing variance in size of the equipment parts as a result of being heated. Therefore, the change in size may be used to provide additional couplings between the first equipment part and second equipment part. Alternatively, the sinterable first equipment part and the second equipment part may have substantially similar coefficients of thermal expansion. In one example, the substantially similar coefficient of thermal expansion is within ten (10) $10^{-6}$ m/(m° C.). In yet another example, a substantially similar coefficient of thermal expansion is within twenty (20)$10^{-6}$ m/(m° C.). Regardless, when the parts are sintered in an oven with controlled temperature, atmospheric makeup (e.g. argon, nitrogen, etc.), and pressure (e.g. applied pressure, atmospheric pressure, vacuum, etc.), the size of an equipment part may be varied by adjusting these three variables. Thus, shrinking may be controlled during the process accordingly. Alternatively, the ratio of metal powder to binding material within the sinterable part may also be adjusted and considered to control the size of shrinking.

Figure 2:
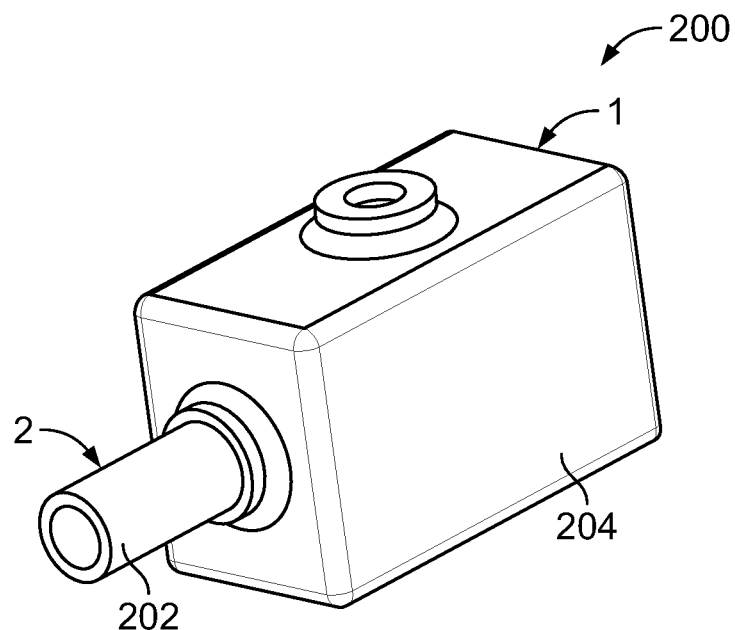
FIG. 2 illustrates a perspective view of equipment.
Figure 3:
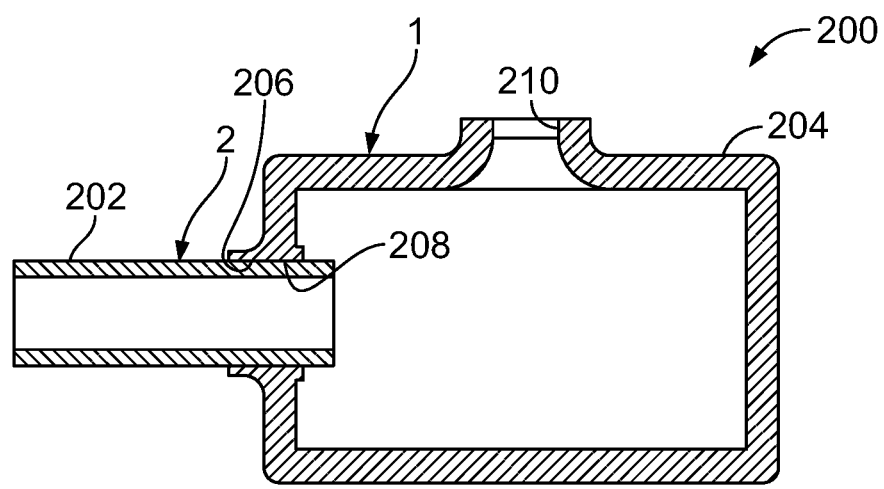
FIG. 3 illustrates a section view of equipment.

FIGS. 2-3 illustrate an example piece of equipment 200 formed using the manufacturing process of FIG. 1. In particular, a first sinterable equipment part 202 is bonded together with a second equipment part 204 at a bonding interface surface 206. In the example, the first sinterable equipment part is a rolled tube that may be formed from a metal injection methodology, or otherwise. Meanwhile, the second equipment part that includes an inlet 208 that includes the bonding surface, and an outlet 210 that has an arcuate tapered surface. In particular, the second equipment part has more complex geometries, and thus may be formed from an additive manufacturing process, and then sintered to the rolled tube. In one example, the first sinterable equipment part is made of the same material as the second equipment part. Alternatively, the first sinterable equipment part is made of a different material than the second equipment part. In such an embodiment, the first sinterable equipment part may be bonded to the second equipment part by holding heat at a first sintering temperature, and then ramping, or increasing, the heat and holding the heat at a second sintering temperature. Alternatively, a sintering aid may be applied to provide matching sintering temperatures, even when the materials of the first sinterable equipment part and second equipment part differ.

Figure 4:
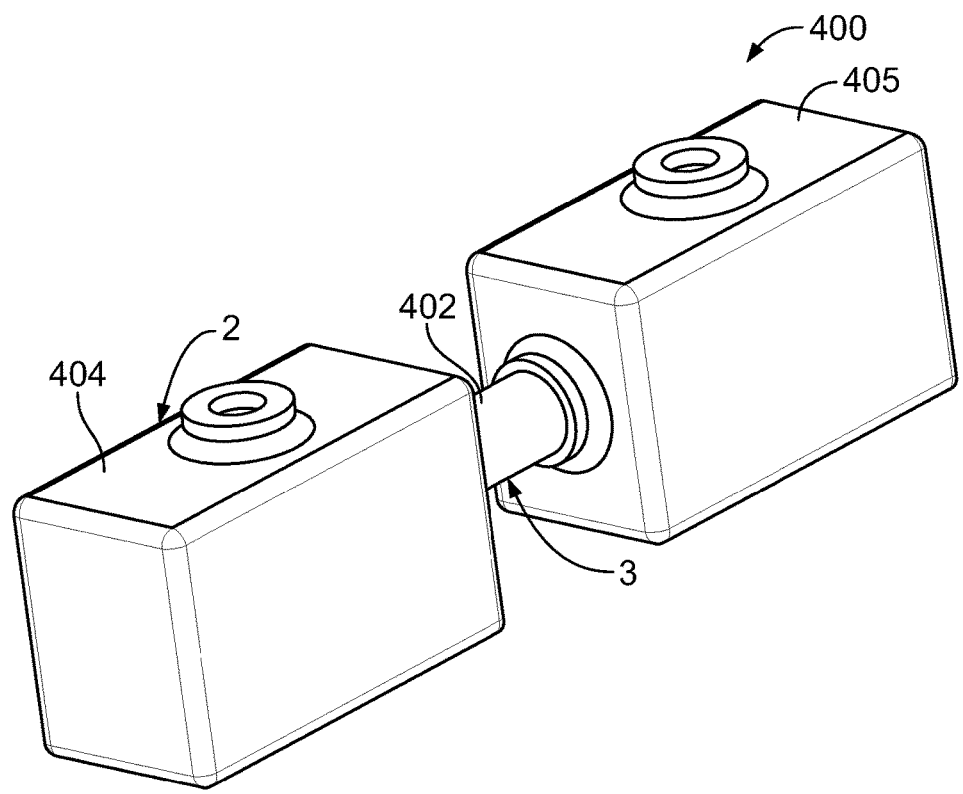
FIG. 4 illustrates a perspective view of equipment.
Figure 5:
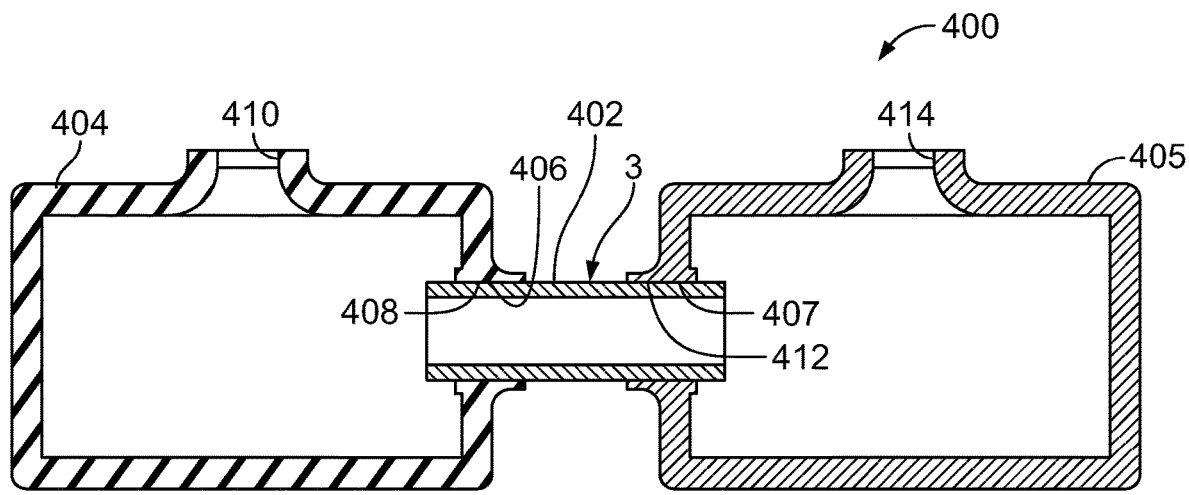
FIG. 5 illustrates a section view of equipment.

FIGS. 4-5 illustrate an example piece of equipment 400 formed using the manufacturing process of FIG. 1. A first sinterable equipment part 402 may be bonded together with a second equipment part 404 at a first bonding interface surface 406, while a third equipment part 405 may be bonded together with the first sinterable equipment part as well at a second bonding interface surface 407. As an example, the first sinterable equipment part may be a rolled tube that may be formed from a metal injection methodology, or otherwise. Meanwhile, the second equipment part may include an inlet 408 that includes the first bonding surface, and an outlet 410 that has an arcuate tapered surface. In particular, the second equipment part has more complex geometries, and thus may be formed from an additive manufacturing process, and then sintered to the rolled tube. In one example, the first sinterable equipment part is made of the same material as the second equipment part. Similarly, the third equipment part also has an inlet 412 that includes the third bonding interface surface, and an outlet 414. in one embodiment, the outlet may have an arcuate tapered surface, in other embodiments the outlet may have relatively more complex geometry. Consequently, the third equipment part may be made from an additive manufacturing process.

The first sinterable equipment part may be made of a different material than the second equipment part and/or the third equipment part. To this end, the first, second, and third equipment parts may each be made of a different material, the same material, or two of the three may be made of the same material with the third being a different material Based on the materials, during the sintering process, the temperature may be ramped and held to a first sintering temperature, second sintering temperature, and/or third sintering temperature. Alternatively, a sintering aid may be applied to either or both of the first and second bonding surfaces to provide matching sintering temperatures, even when the materials of the first sinterable equipment part, second equipment part, and/or third equipment part differ.

Figure 6:
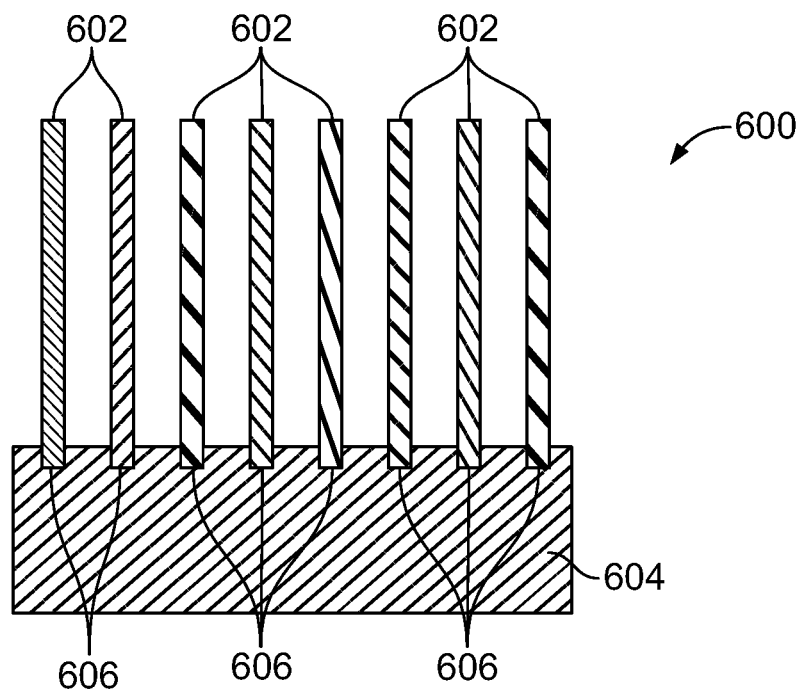
FIG. 6 illustrates a perspective view of equipment.
Figure 7:
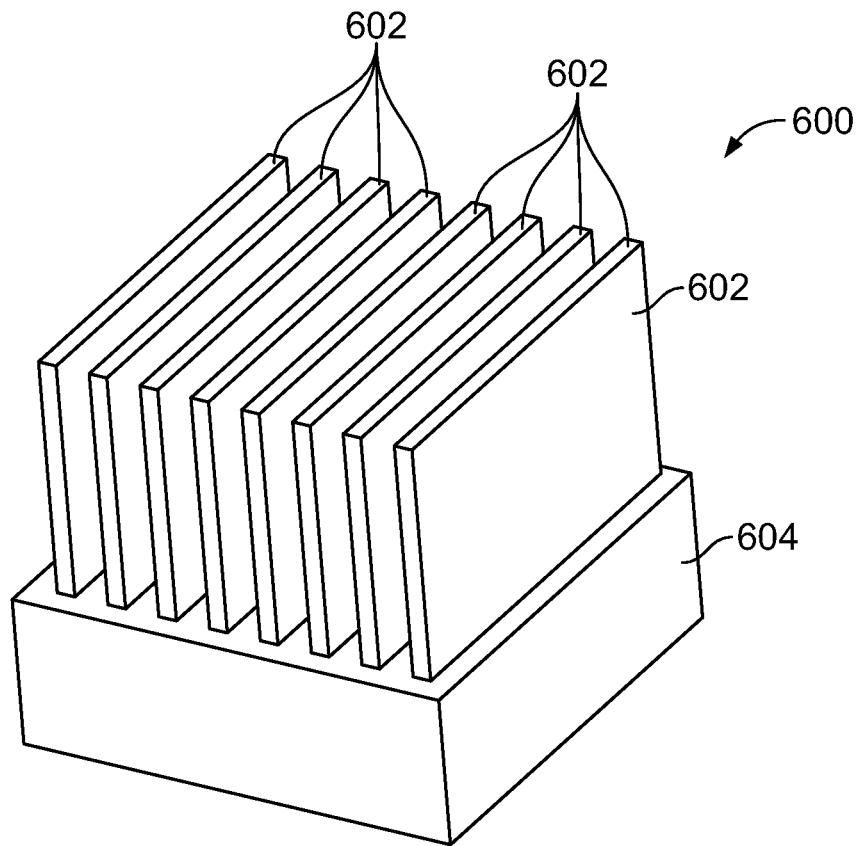
FIG. 7 illustrates a section view of equipment.

FIGS. 6-7 show yet another example of a piece of equipment 600 that may be formed using the process of FIG. 1. In the embodiment of FIGS. 6-7, plural sinterable equipment parts 602 may be formed from a first manufacturing process. In particular, in one example, the plural sinterable equipment parts are plural plates that may be used as a heat exchanger, or heat sink. The plural sinterable equipment parts may be bonded to a second equipment part 604 that includes plural grooves 606 or openings for receiving a corresponding sinterable equipment part of the plural sinterable equipment parts. The second equipment part thus includes the complex geometry of the grooves, and may be formed from an additive manufacturing process. Similar to other embodiments, the materials of the plural sinterable equipment and the second equipment part may be the same or different. Also, sintering may occur at different bonding temperatures, by using a sintering aid or aids, or the like. Thus, while securing the first equipment part to the second equipment part, each are heated to form a monolithic equipment part. Again, like with the other embodiments, by using the different manufacturing method for the different equipment parts, and sintering the equipment parts together, the cost of manufacturing may be reduced while not reducing the overall strength of the piece of the equipment. To this end, complex geometries may be achieved. A technical effect may be an improved manufacturing process.

In one or more embodiments, a method may be provided that includes heating a sinterable first equipment part while securing the first equipment part to a second equipment part to form a monolithic equipment part. Optionally, heating the sinterable first equipment part may sinter the first equipment part. Alternatively, heating the sinterable first equipment part may not sinter the second equipment part. In another aspect, the method also may include forming the sinterable first equipment part as a sinterable three-dimensional green body. Optionally, the sinterable first equipment part and the second equipment part may both sinterable. The sinterable first equipment part may have a first sintering temperature, and the second equipment part may have a second sintering temperature that is different from the first sintering temperature. The method may also include heating the sinterable first equipment part at a temperature that may be at least as hot as a hotter (e.g. greater) sintering temperature of the first sintering temperature and the second sintering temperature. In another aspect, heating the first equipment part and the second equipment part may include ramping a temperature at which the sinterable first equipment part and the second equipment part are heated to the first sintering temperature, and holding the heating temperature of the sinterable first equipment part and the second equipment part at one or more of (a) the first sintering temperature or (b) a temperature that is hotter (e.g. greater) than the first sintering temperature but cooler (e.g. less) than the second sintering temperature. Heating the first equipment part and second equipment part may also include ramping the heating temperature of the sinterable first equipment part and the second equipment part to the second sintering temperature.

Optionally, heating the sinterable first equipment part may bond the sinterable first equipment part to the second equipment part without welding or brazing the sinterable first equipment part to the second equipment part. In one aspect, heating the sinterable first equipment part may shrink the sinterable first equipment part to form an interference fit to the second equipment part without welding or brazing the sinterable first equipment part to the second equipment part. In another example, the sinterable first equipment part may be a green body having a bonding agent, and heating the sinterable first equipment part may remove the bonding agent from the green body. In another aspect, the sinterable first equipment part and the second equipment part may have substantially similar coefficients of thermal expansion.

Optionally, the method may include applying a flux agent at an interface between the sinterable first equipment part and the second equipment part. The flux agent may bond the sinterable first equipment part to the second equipment part during heating. In another aspect, the method may also include adding a sintering aid to the sinterable first equipment part to lower a sintering temperature of the sinterable first equipment part. In another aspect, different amounts of the sintering aid may be added to different volumes of the sinterable first equipment part. In another aspect, the sinterable first equipment part may be formed from metal particles grouped together in a green body by additive manufacturing with a first density of the metal particles in the green body being substantially common throughout the green body prior to adding the sintering aid, the sinterable first equipment part having different densities in the different volumes of the sinterable first equipment part after heating the sinterable first equipment part.

Optionally, the method may also include forming the sinterable first equipment part to include one or more recesses at an interface between the sinterable first equipment part and the second equipment part. In another aspect, the method may also include forming the second equipment part to have an overhanging extension that extends farther from the second equipment part than any extension of the sinterable first equipment part. In one or more embodiments a method is provided that may include additively manufacturing a conductive green body; and obtaining a non-sinterable conductive body. The method may also include heating both the conductive green body and the non-sinterable conductive body together to sinter the conductive green body and to couple the conductive green body with the non-sinterable conductive body.

Optionally, the conductive green body and the non-sinterable conductive body may be formed from different grades of stainless steel. In another example, the conductive green body and the non-sinterable conductive body may be formed from different transition metals. In another aspect, the non-sinterable conductive body may be formed from a cermet or ceramic material. In yet another aspect, obtaining the conductive green body includes printing a three-dimensional green body. In one or more embodiments, a method is provided that may include coupling a sinterable, conductive green body with a non-sinterable body, and sintering the sinterable, conductive green body and the non-sinterable body to form a combined assembly of a sintered conductive body and the non-sinterable body.

In one embodiment, a sintering temperature difference may be used in conjunction with a melting point differential between two materials in a single part or component. Temperature control may be used to create a first structure or skeleton at a first sintering temperature having a slightly higher melting temperature than the first sintering temperature. Then the heat may be increased to create a second structure derivative of the first structure. For example, as the first sintered material melts at the second, higher sintering temperature—now melted the first material can, for example, flow, drain out (if a pathway exists), puddle internally, and the like. That is, rather than form a static sintered part from one material, a first and temporary part is made, followed by a second derivative part that is structured based on the structure of the first, temporary part where the second material sinters (creating a second structure) combined with the melt flow of the first material (hardening after cooling of the final part).

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   forming a sinterable first equipment part from a first material comprising a first sintering temperature;

forming a second equipment part from a second material comprising a second sintering temperature; and joining the sinterable first equipment part to the second equipment part to form a monolithic equipment part by:

securing the sinterable first equipment part to the second equipment part; ramping a temperature of the sinterable first equipment part and the second equipment part to the first sintering temperature;

holding the temperature of the sinterable first equipment part and the second equipment part at the first sintering temperature;

ramping the temperature of the sinterable first equipment part and the second equipment part to the second sintering temperature; and holding the temperature of the sinterable first equipment part and the second equipment part at the second sintering temperature;

wherein the sinterable first equipment part is formed from metal particles grouped together in a green body by additive manufacturing with a first density of the metal particles grouped together in the green body being substantially common throughout the green body, and wherein the sinterable first equipment part has different densities in different volumes of the sinterable first equipment part after sinterable first equipment part is joined to the second equipment part.

2. The method of claim 1, wherein the heating of the sinterable first equipment part sinters the sinterable first equipment part.

3. The method of claim 1, wherein the green body is a sinterable three-dimensional green body.

4. The method of claim 1, wherein the heating of the first sinterable equipment part and the second equipment part includes:

ramping a temperature at which the sinterable first equipment part and the second equipment part are heated to the first sintering temperature;

holding the temperature of the sinterable first equipment part and the second equipment part at one or more of (a) the first sintering temperature or (b) a hotter sintering temperature than the first sintering temperature but cooler than the second sintering temperature; and ramping the temperature of the sinterable first equipment part and the second equipment part to the second sintering temperature.

5. The method of claim 1, wherein the heating of the sinterable first equipment part shrinks the sinterable first equipment part to form an interference fit to the second equipment part without welding or brazing the sinterable first equipment part to the second equipment part.

6. The method of claim 1, wherein the sinterable first equipment part includes a bonding agent, and the heating of the sinterable first equipment part removes the bonding agent from the green body.

7. The method of claim 1, wherein the sinterable first equipment part and the second equipment part have substantially similar coefficients of thermal expansion.

8. The method of claim 1, further comprising applying a flux agent at an interface between the sinterable first equipment part and the second equipment part, the flux agent bonding the sinterable first equipment part to the second equipment part during the heating.

9. The method of claim 1, further comprising adding a sintering aid to the sinterable first equipment part to lower a sintering temperature of the sinterable first equipment part.

10. The method of claim 9, wherein different amounts of the sintering aid are added to different volumes of the sinterable first equipment part.

11. The method of claim 1, further comprising forming the sinterable first equipment part to include one or more recesses at an interface between the sinterable first equipment part and the second equipment part.

12. The method of claim 1, further comprising forming the second equipment part to have an overhanging extension that extends farther from the second equipment part than any extension of the sinterable first equipment part.

13. A method comprising:

additively manufacturing a conductive green body comprising a sintering temperature;

obtaining a non-sinterable conductive body comprising a melting temperature. wherein the sintering temperature is higher than the melting temperature; and heating both the conductive green body and the non-sinterable conductive body to the sintering temperature, wherein heating the the conductive green body and the non-sinterable conductive body creates a derivative structure and couples the conductive green body with the non-sinterable conductive body.

14. The method of claim 13, wherein the conductive green body and the non-sinterable conductive body are formed from different grades of stainless steel.

15. The method of claim 13, wherein the conductive green body and the non-sinterable conductive body are formed from different transition metals.

16. The method of claim 13, wherein the non-sinterable conductive body is formed from a cermet or ceramic material.

17. The method of claim 13, wherein additively manufacturing the conductive green body includes printing a three-dimensional green body.

18. A method comprising:

forming a non-sinterable body:

forming a sinterable conductive green body:

forming a recess in the sinterable conductive green body at an intended interface between the sinterable conductive green body and the non-sinterable body, wherein the recess is configured to facilitate coupling between the non-sinterable body and the sinterable conductive green body:

coupling a sinterable conductive green body with a non-sinterable body about the intended interface by inserting the non-sinterable body into the recess of the sinterable conductive green body; and sintering the sinterable conductive green body, and the non-sinterable body to form a combined assembly of a sintered conductive body and the non-sinterable body.

19. The method of claim 13, wherein the green body is a bonded together mixture of a powdered metal and binder.

20. The method of claim 18, wherein heating both the sinterable conductive green body and the non-sinterable conductive body causes the conductive green body to shrink and form an interference fit about the non-sinterable conductive body.

* * * * *